United States Patent
Longman et al.

(10) Patent No.: US 10,969,466 B2
(45) Date of Patent: Apr. 6, 2021

(54) SLIDING WINDOW INTEGRATION SCHEME FOR OBJECT DETECTION IN A RADAR SYSTEM

(71) Applicant: GM Global Technology Operations LLC, Detroit, MI (US)

(72) Inventors: Oren Longman, Tel Aviv (IL); Igal Bilik, Rehovot (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 214 days.

(21) Appl. No.: 16/188,363

(22) Filed: Nov. 13, 2018

(65) Prior Publication Data

US 2020/0150222 A1    May 14, 2020

(51) Int. Cl.

| G01S 7/35 | (2006.01) |
| G01S 13/931 | (2020.01) |
| G01S 13/72 | (2006.01) |
| G01S 13/58 | (2006.01) |
| G01S 13/34 | (2006.01) |
| G01S 13/00 | (2006.01) |

(52) U.S. Cl.
CPC ............ G01S 7/352 (2013.01); G01S 13/584 (2013.01); G01S 13/726 (2013.01); G01S 13/931 (2013.01)

(58) Field of Classification Search
None
See application file for complete search history.

(56) References Cited

U.S. PATENT DOCUMENTS

| 3,979,748 | A | * | 9/1976 | Gellekink | G01S 13/52 342/132 |
| 6,259,396 | B1 | * | 7/2001 | Pham | G01S 7/412 342/175 |
| 6,646,593 | B1 | * | 11/2003 | Garren | G01S 13/904 342/179 |
| 2004/0243312 | A1 | * | 12/2004 | Schonewille | G01V 1/362 702/14 |
| 2009/0021423 | A1 | * | 1/2009 | Cheng | G01S 7/003 342/25 A |

OTHER PUBLICATIONS

Qian et al., "Wideband-scaled Radon-Fourier transform for high-speed radar detection"; published in the journal IET Radar, Sonar and Navigation; vol. 8, issue 5; pp. 501-512; The Institution of Engineering and Technology; Stevenage, United Kingdom; published in the year 2014. (Year: 2014).*

* cited by examiner

*Primary Examiner* — Bernarr E Gregory
(74) *Attorney, Agent, or Firm* — Cantor Colburn LLP (57) ABSTRACT

A system and method to detect an object with a radar system involve transmitting two or more sets of linear frequency modulated signals with a gap duration Dg, during which there is no transmission, between each of the two or more sets of the linear frequency modulated signals. Each of the two or more sets of the linear frequency modulated signals defines a sub-frame, and two or more sub-frames defines a frame. The method includes receiving reflections resulting from the linear frequency modulated signals encountering one or more objects in a field of view of the radar system, and processing the reflections to identify the one or more objects. The processing includes performing an on-off Radon transform to correct a phase bias caused by the gap duration during which there is no transmission.

20 Claims, 7 Drawing Sheets

SLIDING WINDOW INTEGRATION SCHEME FOR OBJECT DETECTION IN A RADAR SYSTEM

INTRODUCTION

The subject disclosure relates to a sliding window integration scheme for object detection in a radio detection and ranging (radar) system.

Radar systems are increasingly used to detect and track objects. For example, a vehicle (e.g., automobile, truck, construction equipment, farm equipment, automated factory equipment) may include one or more radar systems to detect potential obstacles in its path of travel. Detection of objects facilitates enhanced or automated vehicle operation (e.g., adaptive cruise control, collision avoidance, automatic braking). Generally, radar systems face a tradeoff between frame duration (i.e., the duration of transmission) and frame refresh rate (i.e., how often transmission is performed) such that a longer frame duration typically results in a lower or less frequent frame refresh rate. In addition, the frame duration is limited by the radar duty cycle, which is the time ratio that a radar transmits intermittently. A radar duty cycle is limited due to heat dissipation. Accordingly, it is desirable to provide a sliding window integration scheme for object detection in a radar system.

SUMMARY

In one exemplary embodiment, a method of detecting an object with a radar system includes transmitting two or more sets of linear frequency modulated signals with a gap duration Dg, during which there is no transmission, between each of the two or more sets of the linear frequency modulated signals. Each of the two or more sets of the linear frequency modulated signals defines a sub-frame, and two or more sub-frames defines a frame. The method also includes receiving reflections resulting from the linear frequency modulated signals encountering one or more objects in a field of view of the radar system, and processing the reflections to identify the one or more objects, the processing including performing an on-off Radon transform to correct a phase bias caused by the gap duration during which there is no transmission.

In addition to one or more of the features described herein, the processing the reflections includes obtaining samples of the reflections using an analog-to-digital converter and performing a range Radon Fourier transform on the samples associated with a first frame, the range Radon Fourier transform being a transform along a curve.

In addition to one or more of the features described herein, the samples define a data cube with dimensions of time, chirp, and channel, the chirp referring to the linear frequency modulated signal and the channel referring to a receiver among a plurality of receivers, and the range Radon Fourier transform results in a range-chirp-range rate-channel map, with the range rate referring to a radial velocity of the one or more objects.

In addition to one or more of the features described herein, the processing the reflections also includes adding samples obtained for a next sub-frame transmitted after the sub-frames of the first frame by biasing the range-chirp-range rate-channel map by time shift equivalent to a sum of a duration of the next sub-frame and Dg.

In addition to one or more of the features described herein, the processing the reflections includes defining a second frame as all but an earliest of the sub-frames of the first frame and the next sub-frame.

In addition to one or more of the features described herein, the performing the on-off Radon transform includes integrating the chirps within each of the sub-frames of the first frame and within the next sub-frame and between the sub-frames to generate a Doppler dimension d.

In addition to one or more of the features described herein, correcting the phase bias using the on-off Radon transform includes obtaining:

$$S[r, d, p] = \sum_{m=1}^{M} s[r, m, p] e^{-2\pi j Ph(m,p)} e^{-2\pi j d \frac{m}{M}},$$

where
r, d, p are range, the Doppler dimension d, and a range rate parameter, respectively, s[r,m,p] is a complex waveform with the phase bias, Ph is a phase bias correction factor, and m is an index from 1 to a number of chirps M.

In addition to one or more of the features described herein, the phase bias correction factor Ph is given by:

$$Ph(m, p) = \frac{2p}{\lambda} TOT,$$

where
the transmitted wavelength is $\lambda$, and TOT is an integration time given by a duration of the first frame.

In addition to one or more of the features described herein, the processing includes performing beamforming and detection on a result of the on-off Radon transform to detect the one or more objects.

In addition to one or more of the features described herein, the processing includes obtaining a range to each of the one or more objects.

In another exemplary embodiment, a system to detect an object includes a transmitter to transmit two or more sets of linear frequency modulated signals with a gap duration Dg, during which there is no transmission, between each of the two or more sets of the linear frequency modulated signals. Each of the two or more sets of the linear frequency modulated signals defines a sub-frame, and two or more sub-frames defines a frame. The system also includes a receiver to receive reflections resulting from the linear frequency modulated signals encountering one or more objects in a field of view of the radar system, and a processor to process the reflections to identify the one or more objects. Processing the reflections includes performing an on-off Radon transform to correct a phase bias caused by the gap duration during which there is no transmission.

In addition to one or more of the features described herein, the processor obtains samples of the reflections using an analog-to-digital converter and perform a range Radon Fourier transform on the samples associated with a first frame, the range Radon Fourier transform being a transform along a curve.

In addition to one or more of the features described herein, the samples define a data cube with dimensions of time, chirp, and channel, the chirp referring to the linear frequency modulated signal and the channel referring to a receiver among a plurality of receivers, and the range Radon Fourier transform results in a range-chirp-range rate-channel map, with the range rate referring to a radial velocity of the one or more objects.

In addition to one or more of the features described herein, the processor adds samples obtained for a next sub-frame transmitted after the sub-frames of the first frame by biasing the range-chirp-range rate-channel map by time shift equivalent to a sum of a duration of the next sub-frame and Dg.

In addition to one or more of the features described herein, the processor defines a second frame as all but an earliest of the sub-frames of the first frame and the next sub-frame.

In addition to one or more of the features described herein, the processor performs the on-off Radon transform by integrating the chirps within each of the sub-frames of the first frame and within the next sub-frame and between the sub-frames to generate a Doppler dimension d.

In addition to one or more of the features described herein, the processor corrects the phase bias using the on-off Radon transform by obtaining:

$$S[r, d, p] = \sum_{m=1}^{M} s[r, m, p] e^{-2\pi j Ph(m,p)} e^{-2\pi j d \frac{m}{M}},$$

where r, d, p are range, the Doppler dimension d, and a range rate parameter, respectively, s[r,m,p] is a complex waveform with the phase bias, Ph is a phase bias correction factor, and m is an index from 1 to a number of chirps M.

In addition to one or more of the features described herein, the phase bias correction factor Ph is given by:

$$Ph(m, p) = \frac{2p}{\lambda} TOT,$$

where
the transmitted wavelength is $\lambda$, and TOT is an integration time given by a duration of the first frame.

In addition to one or more of the features described herein, the processor performs beamforming and detection on a result of the on-off Radon transform to detect the one or more objects.

In addition to one or more of the features described herein, the system is in a vehicle, the processor is further configured to obtain a range to each of the one or more objects, and operation of the vehicle is controlled according to the range.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, radar systems are used in many different applications, such as for object detection in vehicles. Generally, in a radar system, frame duration and frame refresh rate are inversely proportional. Yet, while a longer frame duration increases the maximum detectable range a faster (higher) frame refresh rate increases detection update rate of objects. The transmission may comprise a series of linear frequency modulated continuous wave (LFM-CW) waveforms, referred to as chirps. In a multi-input multi-output (MIMO) radar system with multiple transmit elements and multiple receive elements or in a system with multiple transmitters and a single receiver, the multiple transmitters may each transmit a chirp, in turn, for example. In a single input multi-output (SIMO) or single input single output system with a single transmitter and, respectively, multiple or a single receiver, the single transmitter can transmit a series of chirps.

Embodiments of the systems and methods detailed herein facilitate increasing frame duration without a penalty to the frame refresh rate by using sub-frames within a frame and integrating reflections over the frame. Within a window of time referred to as the frame duration, multiple sub-frames are transmitted. Each sub-frame includes a series of chirps, and adjacent sub-frames have gaps (i.e., periods with no transmission) between them. These gaps lead to gaps in the received signals (i.e., reflections) that result when the transmissions encounter objects. By being able to process the reflections resulting from a frame of sub-frames together, the radar system can benefit from the repetition rate of the sub-frames (which is higher than the repetition rate of frames) and the duration of the frame (which is higher than the duration of a sub-frame). However, sampling the gaps in the received signals makes the processing of reflections for a frame more challenging. According to the embodiments detailed herein, a sliding window integration scheme is used for object detection. A sliding window of sub-frames is considered as a frame, and an on-off Radon transform scheme is used in the processing. Radon transform is a general transformation of functions along curves. Radon Fourier transform is a type of Radon transform with exponential kernels, similar to the Fourier transform, and can be seen as a generalization of the Fourier transform with the transformation defined on curvatures rather than on straight lines.

Figure 1:
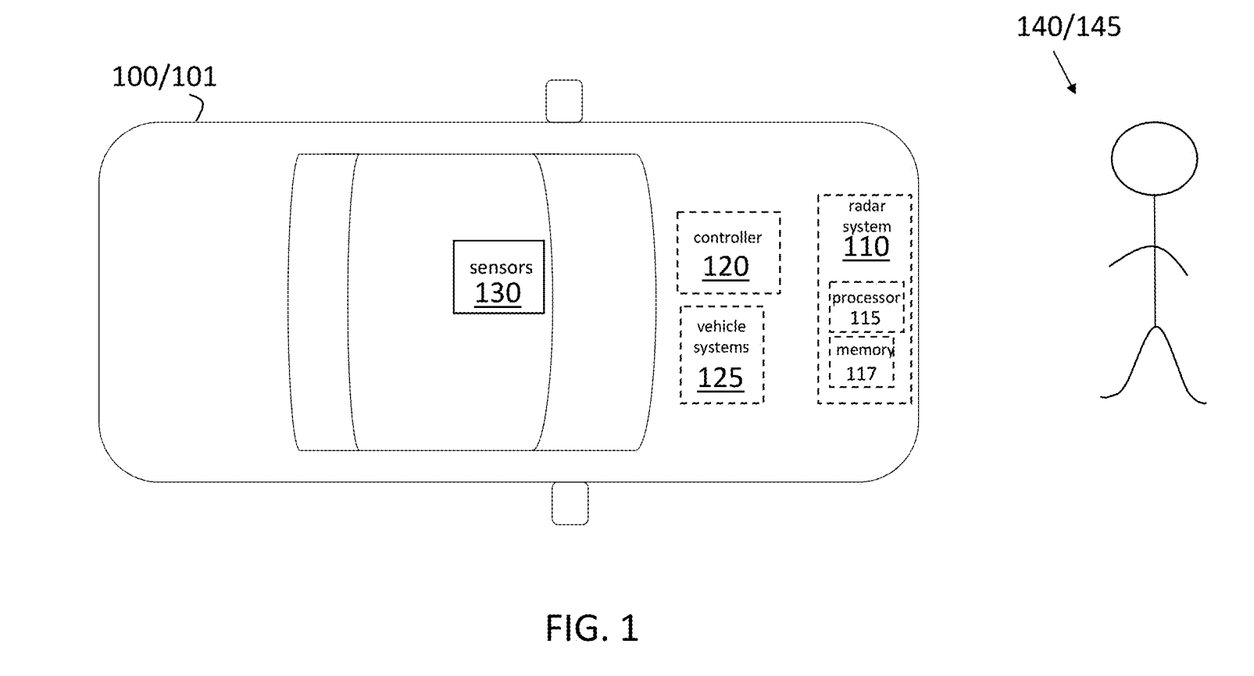
FIG. 1 shows a radar system that benefits from a sliding window integration scheme for object detection according to one or more embodiments.

In accordance with an exemplary embodiment, FIG. 1 shows a radar system 110 that benefits from a sliding window integration scheme for object detection. An exemplary vehicle 100 shown in FIG. 1 is an automobile 101. The automobile 101 is shown with a radar system 110, a controller 120, and vehicle systems 125 under the hood, but, according to alternate embodiments, those and other components may be in one or more different places in and around the vehicle 100. Other sensors 130 (e.g., cameras, lidar system) may also be in or on the vehicle 100 at different locations than the one shown in FIG. 1. The radar system 110 includes components to perform transmission and reception. The radar system 110 can additionally include processing circuitry that may include an application specific integrated circuit (ASIC), an electronic circuit, a processor 115 (shared, dedicated, or group) and memory 117 that executes one or more software or firmware programs, a combinational logic circuit, and/or other suitable components that provide the described functionality.

The controller 120 may be one or a collection of electronic control units (ECUs) that control various vehicle systems 125 (e.g., collision avoidance system, automatic braking system, adaptive cruise control system, autonomous driving system). For example, the controller 120 may communicate with the radar system 110 or with a combination of sensors 130 in addition to the radar system 110 to operate a collision avoidance system of the vehicle 100 based on information about an object 140, such as the pedestrian 145 shown in FIG. 1. The controller 120 may include processing circuitry like the radar system 110. According to alternate embodiments, processing of radar reflections may be performed by the processing circuitry of the radar system 110, the controller 120, or a combination of the two.

Figure 2:
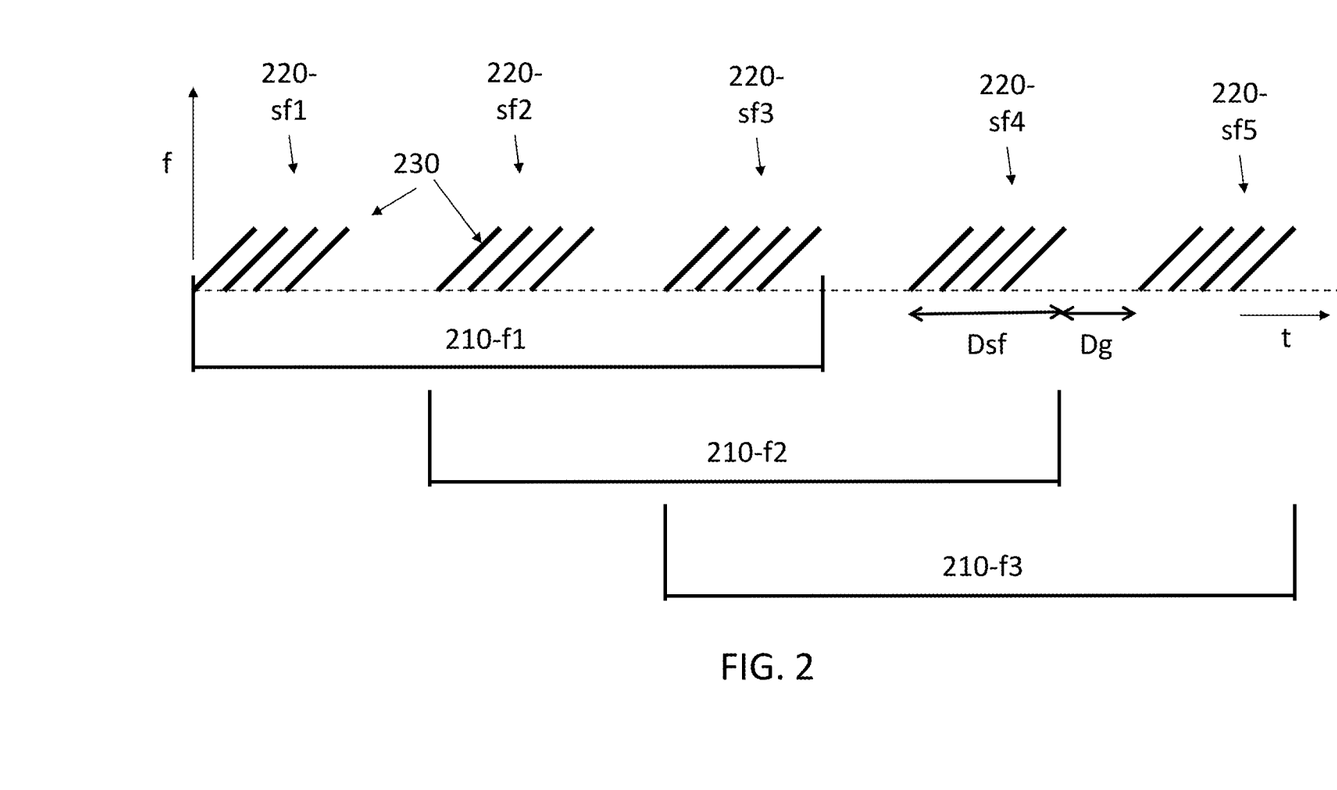
FIG. 2 illustrates transmissions that result in reflections that are processed using a sliding window integration scheme according to one or more embodiments of the invention.

FIG. 2 illustrates transmissions that result in reflections that are processed using a sliding window integration scheme according to one or more embodiments of the invention. Three frames 210-f1, 210-f2, 210-f3 (generally referred to as 210) are indicated for sub-frames 220-f1, 220-f2, 220-f4, 220-f5 (generally referred to as 220). Time t is indicated along one axis, and frequency f is indicated along a perpendicular axis. The sub-frame duration Dsf and gap duration Dg between sub-frames 220 is also indicated. In the exemplary case shown in FIG. 2, each sub-frame 220 includes four chirps 230. Also, in the exemplary case, the chirps 230 include a linear increase in frequency over time (i.e., an upchirp). The frames 210, sub-frames 220, and chirps 230 shown in FIG. 2 are only exemplary. A different number of chirps 230 may make up a sub-frame 220 (e.g., more or fewer transmit elements), and a different number of sub-frames 220 may make up a frame 210.

As previously noted, frame duration (i.e., the time duration of each frame 210) is a major factor in the maximal detection range of the radar system 110 for an object 140 in the field of view. The frame duration is also the integration time TOT. The maximum detectable range to an object 140 is given by:

$$R = \sqrt[4]{\frac{P_t G_t G_r \lambda^2 \sigma TOT}{(4\pi)^3 k T_k B F SNR_{min}}} \quad [EQ. 1]$$

The transmit power is represented by $P_t$, transmit and receive antenna gain are represented respectively by $G_t$ and $G_r$, $\lambda$ is the transmitted wavelength, and $\sigma$ is the radar cross section of the object 140. The thermal noise in the receiver is represented by $kT_kB$, with k being the Boltzmann constant, $T_k$ being temperature in Kelvin, and B being spectral density. $SNR_{min}$ is the minimum signal-to-noise ratio (SNR) and represents receiver sensitivity. As EQ. 1 indicates, the maximum detectable range R and frame 210 duration (TOT) are directly proportional.

Figure 3:
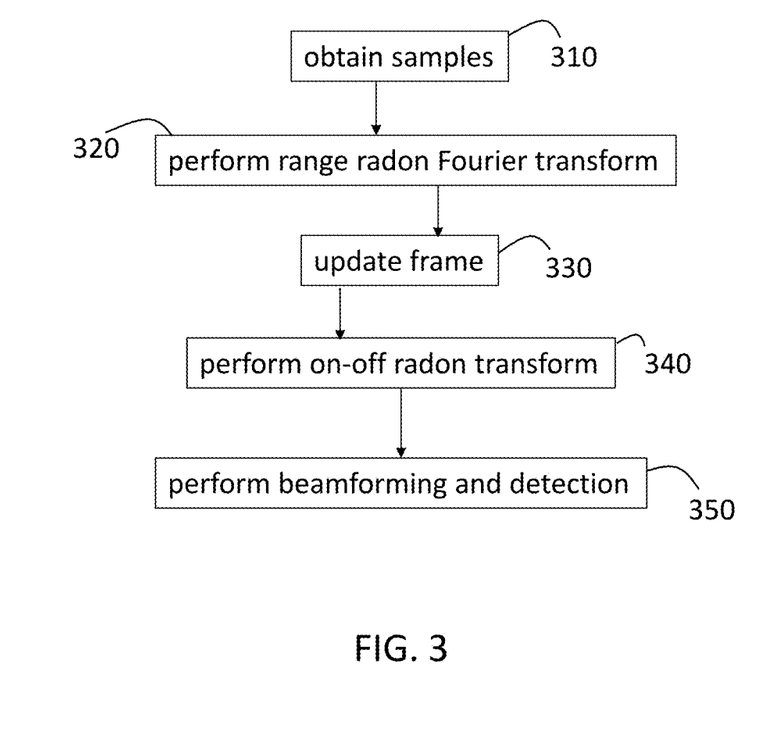
FIG. 3 is a process flow of a method of performing a sliding window integration scheme for object detection in a radar system according to one or more embodiments of the invention.

FIG. 3 is a process flow of a method of performing a sliding window integration scheme for object detection in a radar system according to one or more embodiments of the invention. Before discussing the processes shown in FIG. 3, a brief summary is provided of the traditional processing of reflections. The data cube that is processed has time, chirp, and channel dimensions. After samples of reflected signals are obtained for a frame (i.e., a sub-frame 220 as shown in FIG. 2) by performing an analog-to-digital conversion (ADC), a fast Fourier transform (FFT) with respect to range (referred to as a range FFT) is performed to obtain an indication of energy distribution across ranges for each chirp. There is a different range FFT for each receive channel and transmit channel in a MIMO system. The range-chirp-channel map resulting from the range FFT undergoes a Doppler FFT to obtain a range-Doppler-channel map or a range-Doppler map per receive channel. Digital beamforming is performed to obtain a range-Doppler-beam map or a range-Doppler (relative velocity) map per beam. Digital beamforming involves obtaining a vector of complex scalars from the vector of received signals and the matrix of actual received signals at each receive element for each angle of arrival of a target reflection. Digital beamforming and detection provide an azimuth angle and elevation angle to each of the detected objects based on a thresholding of the complex scalars of the obtained vector. The outputs that are ultimately obtained from processing the received signals are range, Doppler, azimuth, elevation, and amplitude of each object.

According to one or more embodiments, this traditional processing is modified to address the gap between sub-frames 220 that are integrated together in order to obtain a frame duration (TOT) that is longer than the individual sub-frames 220. At block 310, obtaining samples includes obtaining samples for the sub-frames 220 that make up a frame 210 by performing an ADC on received reflections. At block 320, performing a range Radon Fourier transform results in a range-chirp-range rate-channel map, as further detailed. A Radon spectrum is analogous to a Doppler spectrum and is used to address range migration of an object 140.

Updating the frame 210, at block 330, refers to biasing the range Radon Fourier curve due to a time shift of a sub-frame 220 duration Dsf and a sub-frame gap duration Dg when the frame 210 shifts (e.g., from frame 210-f1 to frame 210-f2). This is also further detailed. At block 340, performing an on-off Radon transform integrates the different chirps 230 within each sub-frame 220 and between sub-frames 220 to generate a range-Doppler-range rate-channel map. Performing beamforming and detection, at block 350, then results in detecting objects 140 using a range-Doppler-range rate-beam map to obtain range, Doppler, azimuth, elevation, and amplitude of each object. The coherent integration over sub-frames 220 of a frame 210 result in SNR for object detection increasing by a factor of the number of sub-frames 220.

Obtaining the range Radon Fourier transform, at block 320, is performed for each sub-frame 220. This transform aligns the reflections across chirps 230 for a given range rate parameter p. The transform F[r, m, p] for the range dimension r, the chirp dimension m, and range rate parameter p is given by:

$$F[r, m, p] = \sum_{n=1}^{N} f[n, m]e^{-2\pi jR(n,m,p)}e^{-2\pi j\frac{n}{N}} \quad [\text{EQ. 2}]$$

The sample dimension n goes from 1 to N, the number of samples. The range to an object 140 may be determined as:

$$R(n, m, p) = \text{frequency} \cdot \text{time} = \left(m \cdot PRI \cdot \frac{2*\text{slope}}{c}\right)(n \cdot fs) \quad [\text{EQ. 3}]$$

The speed of light is indicated by c. The pulse repetition frequency PRI is the frequency with which sub-frames 220 are transmitted and is given by 1/(Dsf+Dg).
The slope is the slope of the chirps 230 or the increase in frequency f over time t, and $f_s$ is the sampling frequency.

Figure 4:
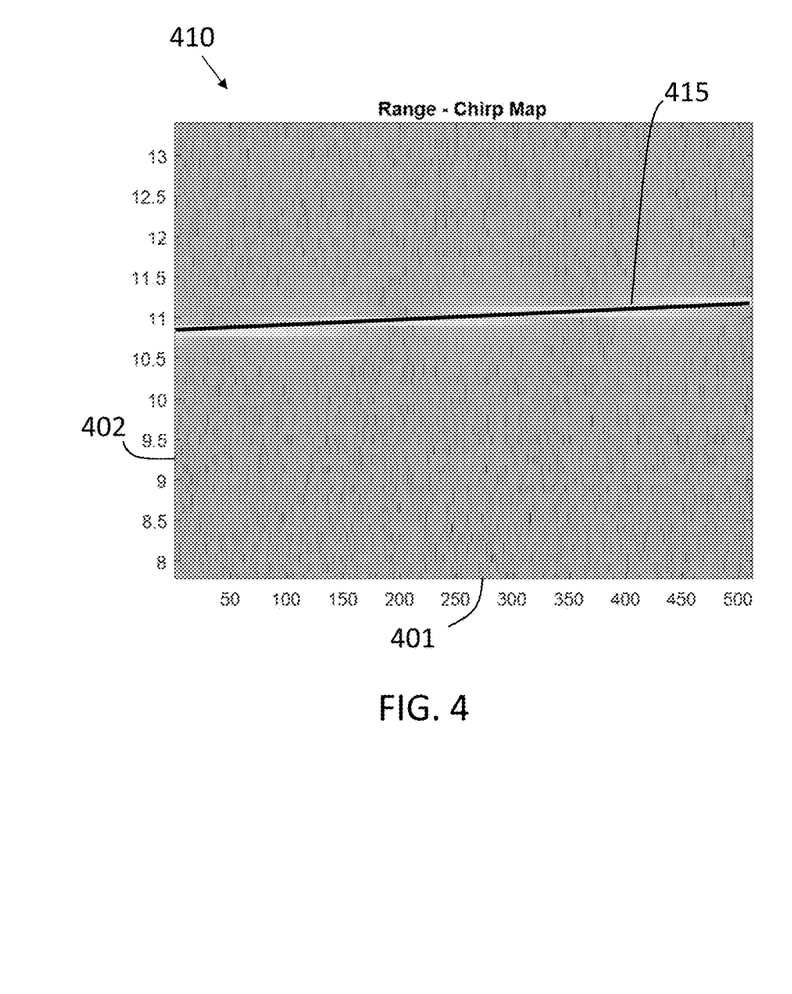
FIG. 4 shows an exemplary range Radon Fourier transform used in the sliding window integration scheme according to one or more embodiments.
Figure 5:
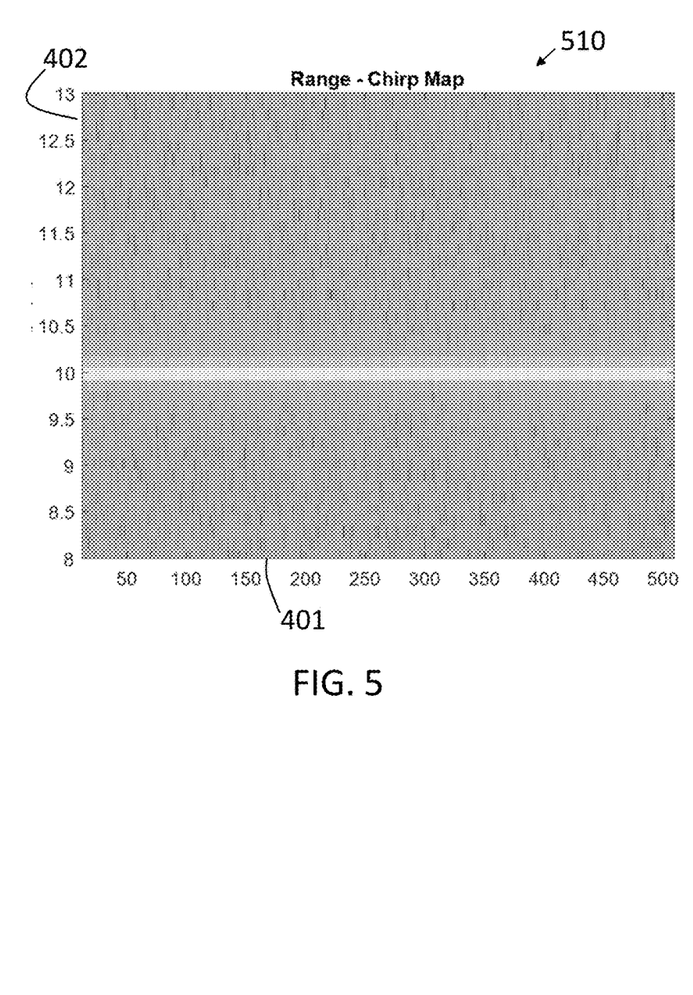
FIG. 5 shows an exemplary range Radon Fourier transform with the range rate parameter set to the radial velocity of an object.

FIG. 4 shows an exemplary range Radon Fourier transform 410 that aligns the reflections across chirps 230. A Radon curve 415 is indicated. Chirp index is indicated along axis 401, and range in meters (m) is indicated along axis 402. FIG. 5 shows an exemplary range Radon Fourier transform 510 with the range rate parameter p set to Vr, the radial velocity of an object 140.

Updating the frame 210, at block 330, refers to the operation of the sliding window. As a new sub-frame 220 is added to a frame 210 (e.g., sub-frame 220-sf4 is added to frame 210-f1), the oldest sub-frame 220 in the previous frame 210 is removed (e.g., sub-frame 220-sf1 is removed to form frame 210-f2). The Radon curve 415 is biased by the time shift TS equivalent of the duration of a sub-frame 220 and a gap Dg. The time shift TS is fixed and is given by:

$$TS[r, m, p] = F\left[r - \frac{(M \cdot PRI + Dg) \cdot p}{\Delta R}, m, p\right] \quad [\text{EQ. 4}]$$

In EQ. 4, M is the number of chirps 230 within a sub-frame 220, and ΔR is the range resolution and is given by:

$$\Delta R = \frac{1}{\text{slope} \cdot PRI} \frac{c}{2} \quad [\text{EQ. 5}]$$

Performing an on-off Radon transform, at block 340, is a transformation that integrates the different chirps 230 within each sub-frame 220 and between sub-frames 220. This transformation generates the Doppler dimension d. The gaps of duration Dg between the sub-frames 220 generate phase bias for each object 140. The phase bias is a function of the Doppler frequency related to an object 140 and the gap and is corrected as part of the on-off Radon transformation according to the following:

$$S[r, d, p] = \sum_{m=1}^{M} s[r, m, p]e^{-2\pi jPh(m,p)}e^{-2\pi jd\frac{m}{M}} \quad [\text{EQ. 6}]$$

In EQ. 6, s[r,m,p] is a complex waveform that includes the phase bias, and Ph is the phase bias correction factor given by:

$$Ph(m, p) = \frac{2p}{\lambda} TOT \quad [\text{EQ. 7}]$$

The digital beamforming, at block 350, includes detection with a first stage including peak detection.

Figure 6:
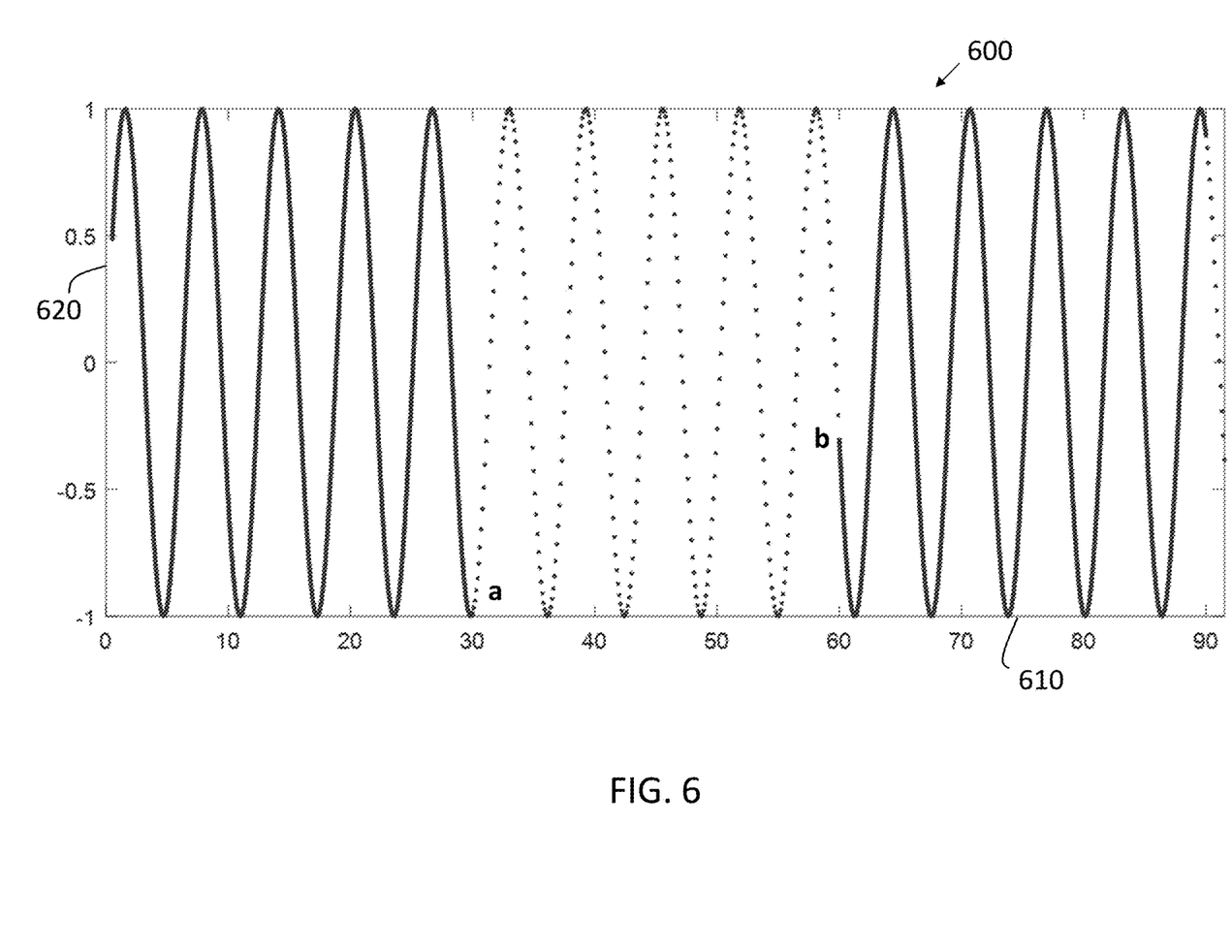
FIG. 6 shows the real part of complex waveform for a detected object with a given value in the range dimension and range rate parameter.
Figure 7:
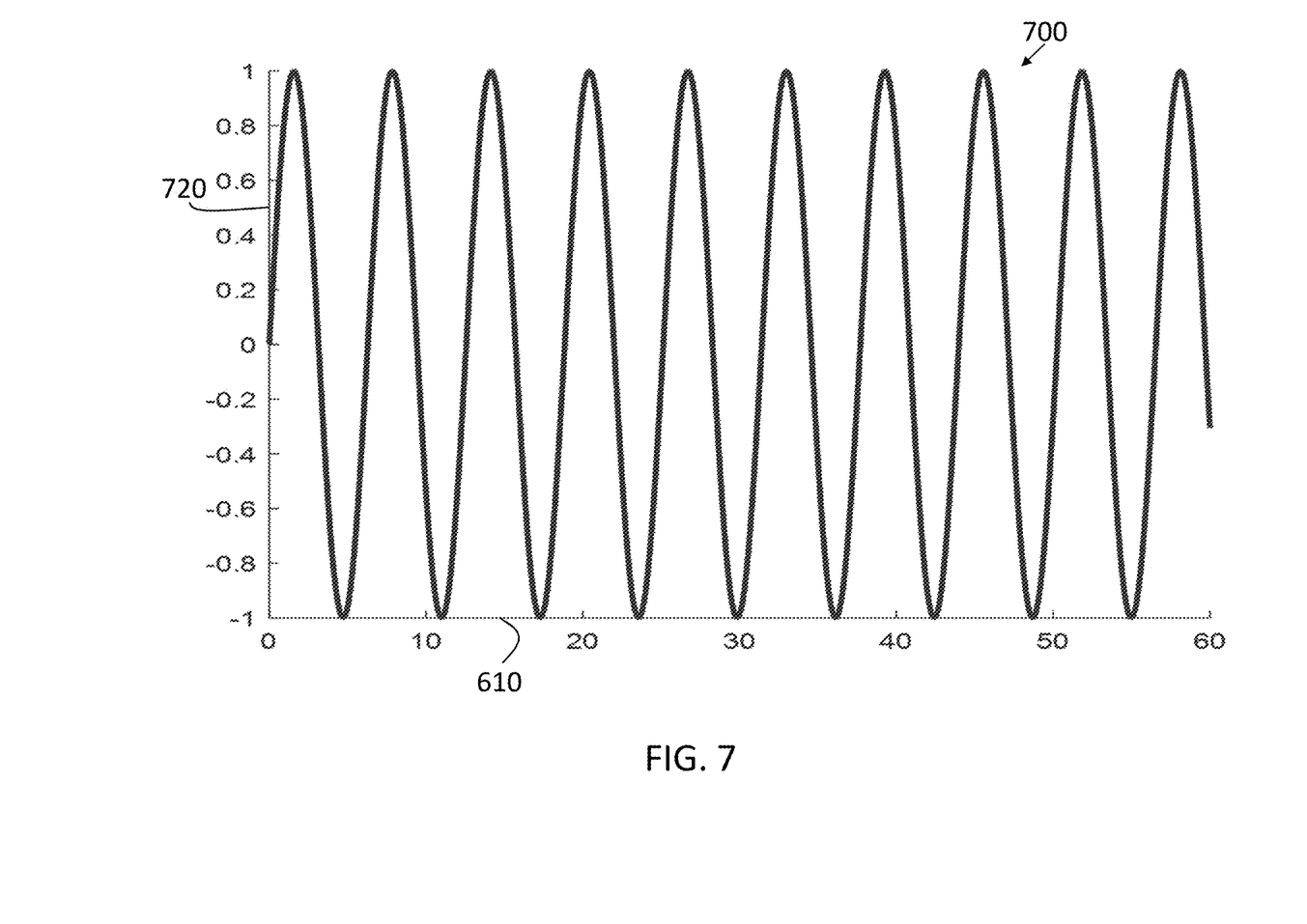
FIG. 7 shows the real part of complex waveform for the same detected object shown in FIG. 6.

FIG. 6 shows the real part of complex waveform s[r, m, p] (i.e., waveform 600), along axis 620, for a detected object 140 with a given value in the range dimension r and range rate parameter p. The time in microseconds in indicated along axis 610. As FIG. 6 indicates, the gap of duration Dg results in a phase jump in the waveform 600 between a and b. FIG. 7 shows the real part of complex waveform S[r, d, p] (waveform 700), along axis 720, for the same detected object 140. As FIG. 7 indicates, the on-off Radon transformation, according to EQ. 6, results in the phase jump in the waveform 600 being removed in the waveform 700.

Figure 8:
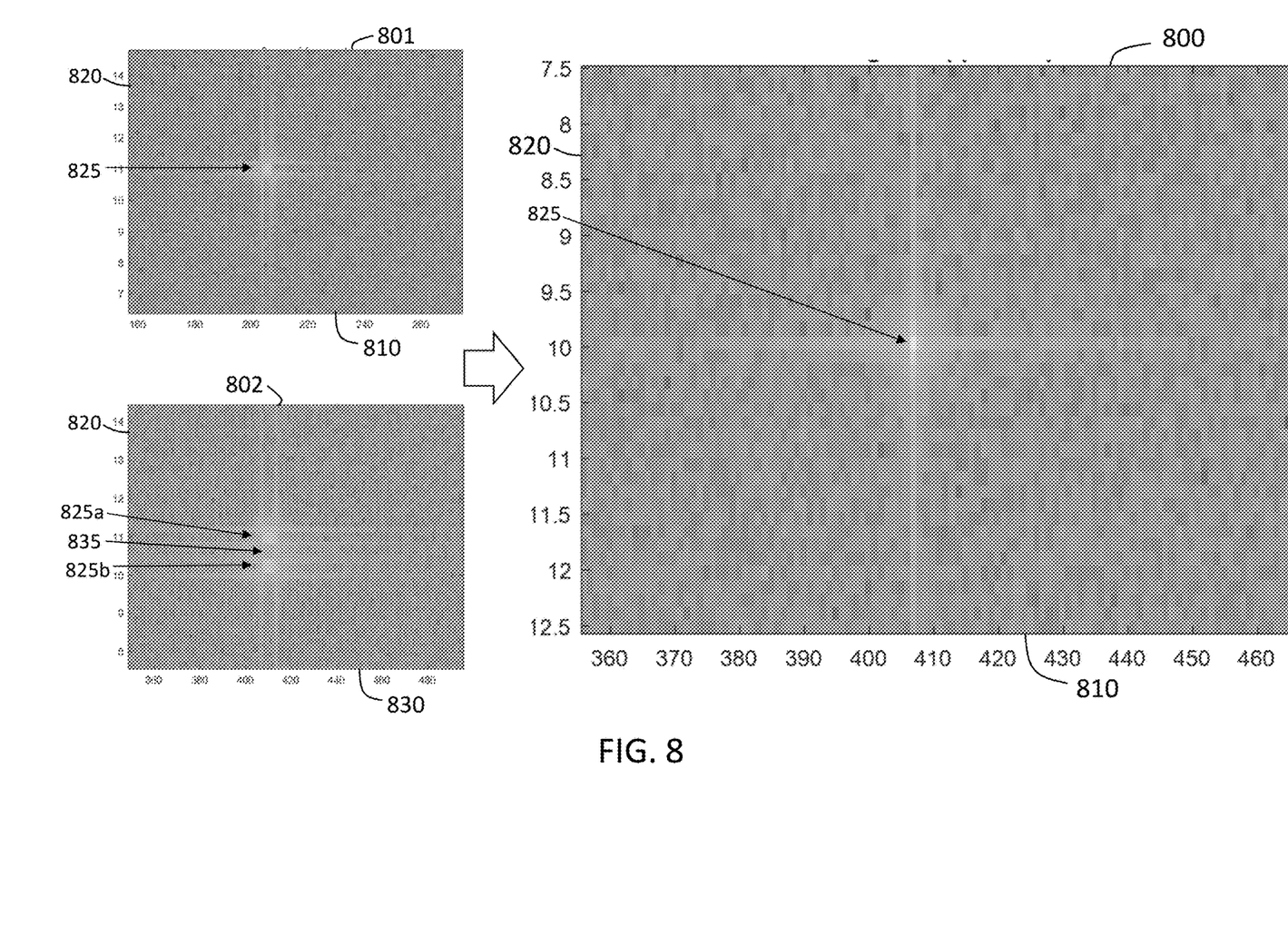
FIG. 8 illustrates an improvement in signal-to-noise ratio based on using a sliding window integration scheme according to one or more embodiments.

FIG. 8 illustrates an improvement in SNR based on using a sliding window integration scheme according to one or more embodiments. A range-Doppler map 801 is shown for a frame 210 that includes sub-frames 220 with gaps in between. Doppler index is indicated along axis 810, and range in meters is indicated along axis 820. As the range-Doppler map 801 indicates, the detection 825 of the object 140 is spread over multiple range cells. The peak power of the detection is 90 decibels (dB). A range-Doppler map 802 is shown for multiple frames 210. There is no increase in the SNR based on processing more than one frame 210. Each of the detections 825a, 825b of the object 140 corresponding with each frame 210 is spread over multiple range cells, and there is a gap 835 of a set of range cells between the two detections 825a, 825b.

The range-Doppler map 800 results from target integration along the correct curve (i.e., the on-off Radon transformation with range rate parameter p set to radial velocity Vr of the object 140). As the range-Doppler map 800 indicates, the detection 825 is in a single range cell. This accumulation of the signal in one range cell results in a 7 dB increase in SNR in the exemplary case shown in FIG. 8. A 4 dB improvement may be attributed to range migration compensation and 3 dB to the multi-frame coherent integration.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A method of detecting an object with a radar system, the method comprising:
transmitting two or more sets of linear frequency modulated signals with a gap duration Dg, during which there is no transmission, between each of the two or more sets of the linear frequency modulated signals, wherein each of the two or more sets of the linear frequency modulated signals defines a sub-frame, and two or more sub-frames define a frame;
receiving reflections resulting from the linear frequency modulated signals encountering one or more objects in a field of view of the radar system; and processing the reflections to identify the one or more objects, the processing including performing an on-off Radon transform to correct a phase bias caused by the gap duration Dg during which there is no transmission, wherein the on-off Radon transform is an integral transform and includes performing integration both within and between different ones of the two or more sub-frames.

2. The method according to claim 1, wherein the processing the reflections includes obtaining samples of the reflections using an analog-to-digital converter and performing a range Radon Fourier transform on the samples associated with a first frame, the range Radon Fourier transform being a transform along a curve.

3. The method according to claim 2, wherein the samples define a data cube with dimensions of time, chirp, and channel, the chirp referring to the linear frequency modulated signal and the channel referring to a receiver among a plurality of receivers, and the range Radon Fourier transform results in a range-chirp-range rate-channel map, with the range rate referring to a radial velocity of the one or more objects.

4. The method according to claim 3, wherein the processing the reflections also includes adding samples obtained for a next sub-frame transmitted after the sub-frames of the first frame by biasing the range-chirp-range rate-channel map by time shift equivalent to a sum of a duration of the next sub-frame and the gap duration Dg.

5. The method according to claim 4, wherein the processing the reflections includes defining a second frame as all but an earliest of the sub-frames of the first frame and the next sub-frame.

6. The method according to claim 4, wherein the performing the on-off Radon transform includes integrating the chirps within each of the sub-frames of the first frame and within the next sub-frame and between the sub-frames to generate a Doppler dimension d.

7. The method according to claim 6, wherein correcting the phase bias using the on-off Radon transform includes obtaining:

$$S[r, d, p] = \sum_{m=1}^{M} s[r, m, p] e^{-2\pi j Ph(m,p)} e^{-2\pi j d \frac{m}{M}},$$

where
r, d, p are range, the Doppler dimension d, and a range rate parameter, respectively, s[r,m,p] is a complex waveform with the phase bias, Ph is a phase bias correction factor, and m is an index from 1 to a number of chirps M.

8. The method according to claim 7, wherein the phase bias correction factor Ph is given by:

$$Ph(m, p) = \frac{2p}{\lambda} TOT,$$

where
the transmitted wavelength is λ, and TOT is an integration time given by a duration of the first frame.

9. The method according to claim 1, wherein the processing includes performing beamforming and detection on a result of the on-off Radon transform to detect the one or more objects.

10. The method according to claim 1, wherein the processing includes obtaining a range to each of the one or more objects.

11. A system to detect an object, the system comprising:
a transmitter configured to transmit two or more sets of linear frequency modulated signals with a gap duration Dg, during which there is no transmission, between each of the two or more sets of the linear frequency modulated signals, wherein each of the two or more sets of the linear frequency modulated signals defines a sub-frame, and two or more sub-frames define a frame;
a receiver configured to receive reflections resulting from the linear frequency modulated signals encountering one or more objects in a field of view of the radar system; and
a processor configured to process the reflections to identify the one or more objects, wherein processing the reflections includes performing an on-off Radon transform to correct a phase bias caused by the gap duration Dg during which there is no transmission, wherein the on-off Radon transform is an integral transform and includes performing integration both within and between different ones of the two or more sub-frames.

12. The system according to claim 11, wherein the processor is configured to obtain samples of the reflections using an analog-to-digital converter and perform a range Radon Fourier transform on the samples associated with a first frame, the range Radon Fourier transform being a transform along a curve.

13. The system according to claim 12, wherein the samples define a data cube with dimensions of time, chirp, and channel, the chirp referring to the linear frequency modulated signal and the channel referring to a receiver among a plurality of receivers, and the range Radon Fourier transform results in a range-chirp-range rate-channel map, with the range rate referring to a radial velocity of the one or more objects.

14. The system according to claim 13, wherein the processor is further configured to add samples obtained for a next sub-frame transmitted after the sub-frames of the first frame by biasing the range-chirp-range rate-channel map by time shift equivalent to a sum of a duration of the next sub-frame and the gap duration Dg.

15. The system according to claim 14, wherein the processor is further configured to define a second frame as all but an earliest of the sub-frames of the first frame and the next sub-frame.

16. The system according to claim 14, wherein the processor is further configured to perform the on-off Radon transform by integrating the chirps within each of the sub-frames of the first frame and within the next sub-frame and between the sub-frames to generate a Doppler dimension d.

17. The system according to claim 16, wherein the processor is further configured to correct the phase bias using the on-off Radon transform by obtaining:

$$S[r, d, p] = \sum_{m=1}^{M} s[r, m, p] e^{-2\pi j Ph(m,p)} e^{-2\pi j d \frac{m}{M}},$$

where
r, d, p are range, the Doppler dimension d, and a range rate parameter, respectively, s[r,m,p] is a complex waveform with the phase bias, Ph is a phase bias correction factor, and m is an index from 1 to a number of chirps M.

18. The system according to claim 17, wherein the phase bias correction factor Ph is given by:

$$Ph(m, p) = \frac{2p}{\lambda} TOT,$$

where
the transmitted wavelength is $\lambda$, and TOT is an integration time given by a duration of the first frame.

19. The system according to claim 11, wherein the processor is further configured to perform beamforming and detection on a result of the on-off Radon transform to detect the one or more objects.

20. The system according to claim 11, wherein the system is in a vehicle, the processor is further configured to obtain a range to each of the one or more objects, and operation of the vehicle is controlled according to the range.

* * * * *